Oct. 7, 1969  P. M. THOMAS ET AL  3,471,036

BRICK STACKING MACHINE

Filed Aug. 28, 1967

INVENTORS
PAUL M. THOMAS
LAWRENCE W. WRIGHT
EUGENE E. CRILE
LEON H. TOLLESON
JESSE N. PARMER
BY
Wm. H. Dean

Oct. 7, 1969     P. M. THOMAS ET AL     3,471,036
BRICK STACKING MACHINE
Filed Aug. 28, 1967     10 Sheets-Sheet 1

3,471,036
BRICK STACKING MACHINE
Paul M. Thomas, Phoenix, Lawrence W. Wright, Scottsdale, and Eugene E. Crile, Leon H. Tolleson, and Jesse N. Parmer, Phoenix, Ariz., assignors to Builders Equipment Company, Glendale, Ariz., a corporation of Arizona
Filed Aug. 28, 1967, Ser. No. 663,763
Int. Cl. B65g 57/20, 7/12
U.S. Cl. 214—6          20 Claims

ABSTRACT OF THE DISCLOSURE

A brick stacking machine having a carriage mechanism adapted to separate bricks of a contiguous row of bricks to form voids in a course of stacked bricks, said carriage having a plurality of separable sections movable toward and away from each other, whereby when the sections are moved toward each other they support brick engaging members adapted to engage bricks at opposite sides of a row of said bricks, when in contiguous relation with each other, and whereupon after the bricks are engaged and held by the sections of the carriage, the separable portions may be moved away from each other so that the bricks carried by the separable portions may be separated to provide voids between the contiguous bricks in the row, and to thus form a void course with openings through which handling devices of a fork lift truck, or the like, may be inserted.

This invention relates to a brick stacking machine, and more particularly, to a brick stacking machine adapted to stack superimposed courses of bricks, and to leave voids or openings in the stack through which forks of conventional fork lift trucks, or the like, may be inserted to handle the stack of bricks after it has been bound by a conventional metal strap, or the like.

Background of the invention

Conventional building bricks have been bundled in stacks convenient for transportation to a job site at which brick masons mortar bricks into walls, or the like. The conventional stacks of bricks are surrounded by metal bands to hold them in a compact bundle or package, and due to the weight of such stacks of bricks, various means have been provided for transporting the bricks around at the site or from points of delivery on a lot or other area to a point of actual use.

Heretofore, bricks have been stacked, such that one of the courses near the lower portion of the stack is provided with void openings simply by omitting some of the bricks in the stack, and usually these void openings are overlaid by wooden lintels, or the like, to retain the superimposed bricks in position, while the entire stack of bricks is surrounded by a metal band under tension to hold the bricks in a stack. Accordingly, the void openings in the void course provide areas through which conventional fork lift truck forks may be inserted to pick up the stack of bricks, and transport them from place to place on a job site, or the like. Various machines have been devised for stacking bricks, and particularly to provide voids in the courses of bricks which are disposed in a contiguous relation to each other.

Many difficulties have been encountered in the design and operation of brick stacking machines due to the fact that there are various sizes of bricks predicated upon the particular modulus desired, and further due to the character of the clay and other materials used to make bricks, and with regard to variations in forming and firing these bricks, they vary slightly in overall dimensions. When bricks vary substantially from a mean dimension, and when assembled in an elongated row, where the bricks are contiguous to each other, the overall accumulated length of the row may vary considerably, and this has caused substantial problems in the automatic handling of bricks by machinery of fixed structural proportion.

Summary of the invention

In accordance with the present invention, a void course in a stack of bricks is formed by a novel carriage mechanism which is movable horizontally, and comprises a plurality of separable sections adapted to be moved away from each other and toward each other into contiguous relationship, and adapted to engage opposite sides of a row of contiguous bricks for holding the bricks on the carriage, whereupon after the bricks are engaged by brick engaging means at opposite sides of the row of bricks, the separable sections of the carriage are power operated away from each other carrying the engaged bricks with them, to separate the separable sections of the carriage so as to separate the groups of the bricks apart to provide voids between the bricks to form a course of bricks in a stack, wherein void openings are formed to receive handling devices, such as the forks of a power operated fork lift truck, or the like.

Additionally, the invention comprises a brick row end locator means movably mounted back and forth longitudinally in the direction of the longitudinal axis of a row of bricks collected for engagement by the carriage of the machine, and means on an elevator of the machine for measuring the overall length of a row of bricks accumulated thereon, and further means for adjusting the row end locator so as to precisely locate a row of bricks of varying dimensions with respect to separable brick carrying sections of the carriage.

Accordingly, it is an object of the present invention to provide a very simple, reliable, and economical brick stacking machine.

Another object of the invention is to provide a novel brick stacking machine comprising a brick carriage having separable sections adapted to engage and carry bricks and to separate them in separate groups horizontally to provide a void course of bricks in a stack formed on an elevator of the machine of the invention.

Another object of the invention is to provide a novel means for compensating for varying dimensions or an aggregate variation in dimensions of a contiguous row of bricks with relation to separable brick carrying sections of a carriage of the machine, which is adapted when the sections are separated to provide a void course in a stack of bricks to form machine handling void openings in the stack.

Another object of the invention is to provide a brick stacking machine having a novel combination of a brick conveyor, brick row collector, brick handling carriage with separable sections, and a novel means for reciprocally actuating the carriage with respect to the collector and elevator of the machine, as well as the movement of the carriage and a pallet handling means with respect to the elevator of the machine.

Another object of the invention is to provide a novel brick stacking machine having very simple brick stacking mechanism and controls which operate at a fairly high rate automatically to form stacks of bricks with void courses therein ready to be bundled.

Further objects and advantages of the invention may be apparent from the following specification, appended claims, and accompanying drawings, in which:

Description of the preferred embodiments

As shown in FIGS. 1, 2, 3 and 6 of the drawings, the machine of the invention is provided with a main frame 24, which may be made of suitable structural steel, or the like. Located at an end 26 of the main frame is an endless conveyor 28 which may be generally of the belt-type, and which passes over a suitable roller 30 adjacent said end 26 of the main frame. This conveyor is adapted to carry bricks on an upper belt surface 32 thereof, and deliver them toward the main frame 24 in the direction of an arrow 34, as shown best in FIG. 6 of the drawings. The conveyor is provided with spaced side rails 36 and 38 between which a contiguous row of bricks may be moved in the direction of the arrow 34 toward a collector deck 40, shown best in FIGS. 2 and 6 of the drawings. The conveyor 28, when carrying a contiguous row of bricks thereon in the direction of the arrow 34, forces the bricks onto the upper surface of the collector deck 40, which is preferably a smooth metal plate. This collector deck 40 may decline slightly from its receiving end 42, to its opposite end 46 thereof in relation to the direction of tracks 48 at opposite sides thereof on which the movable carriage frame 50 of the invention is supported by rollers 52. Accordingly, the tracks 48 and the deck 40 diverge from the end 42 toward a position over an elevator 54 of the invention. The divergence of the tracks 48 and the collector deck 40 being in a vertical direction and toward the direction of the elevator 54 in order to provide for relief of blocks slidably carried by the carriage of the invention, as will be hereinafter described in detail. The movable frame 50 is afforded lateral support on the main frame 24 by means of outboard rollers 56 which engage complemental strap portions on the main frame to prevent lateral movement of the movable frame 50 relative to the main frame 24 when the movable frame or carriage frame 50 travels from a position over the collector deck 40 to a position over the elevator 54, as indicated best in FIGS. 2 and 6 of the drawings.

Coupled pivotally by means of a pin 58 to the movable frame 50 is a link 60 having its opposite ends pivotally connected by a pin 62 to a crank arm 64 driven by a gear motor 66 about an output shaft axis 68. Thus, the pin 62 travels in a circular path, as indicated by broken lines 70 in FIG. 9 of the drawings.

Figures 8, 9:
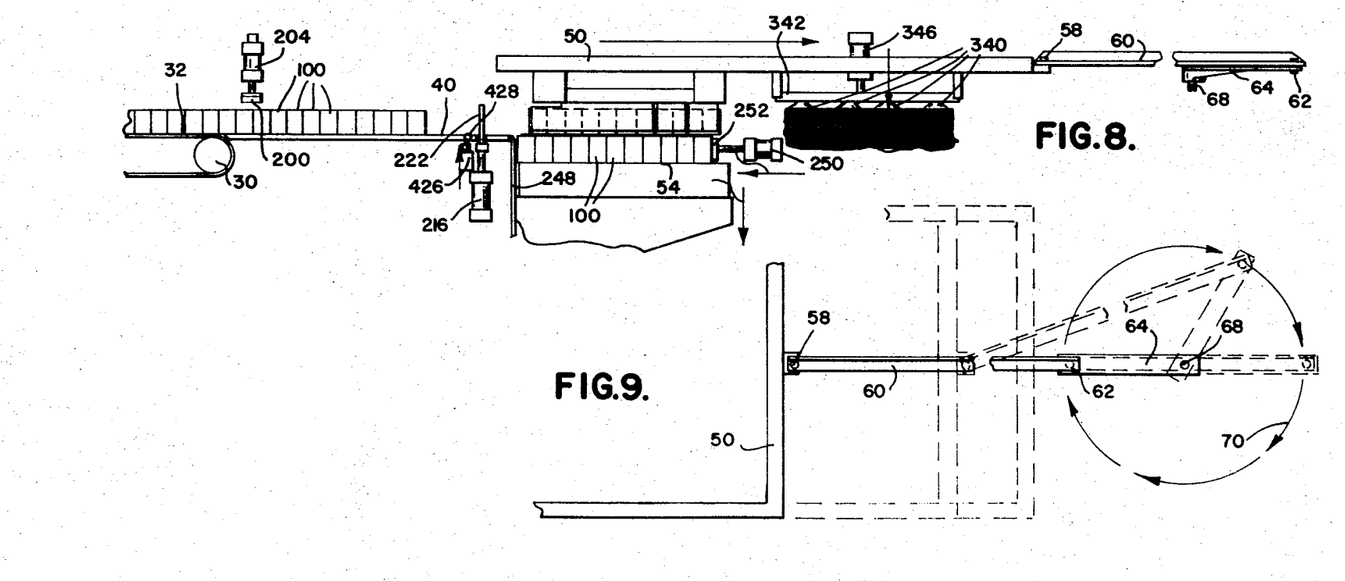
FIG. 8 is a view similar to FIG. 7, but showing varying positions of the carriage mechanism of the machine diagrammatically with relation to a pallet magazine and the elevator of the machine.
FIG. 9 is a fragmentary plan view, taken from the line 9—9 of FIG. 7, showing varying positions of the carriage drive mechanism of the invention.

It will be seen that the pin 62 in connection with the link 60, as it travels about an arcuate path 70, accelerates the carriage frame 50 very slowly at the beginning of each reciprocal back and forth movement in a direction from a position over the collector plate 40 to a position over the elevator 54 or in the opposite direction.

Figure 2:
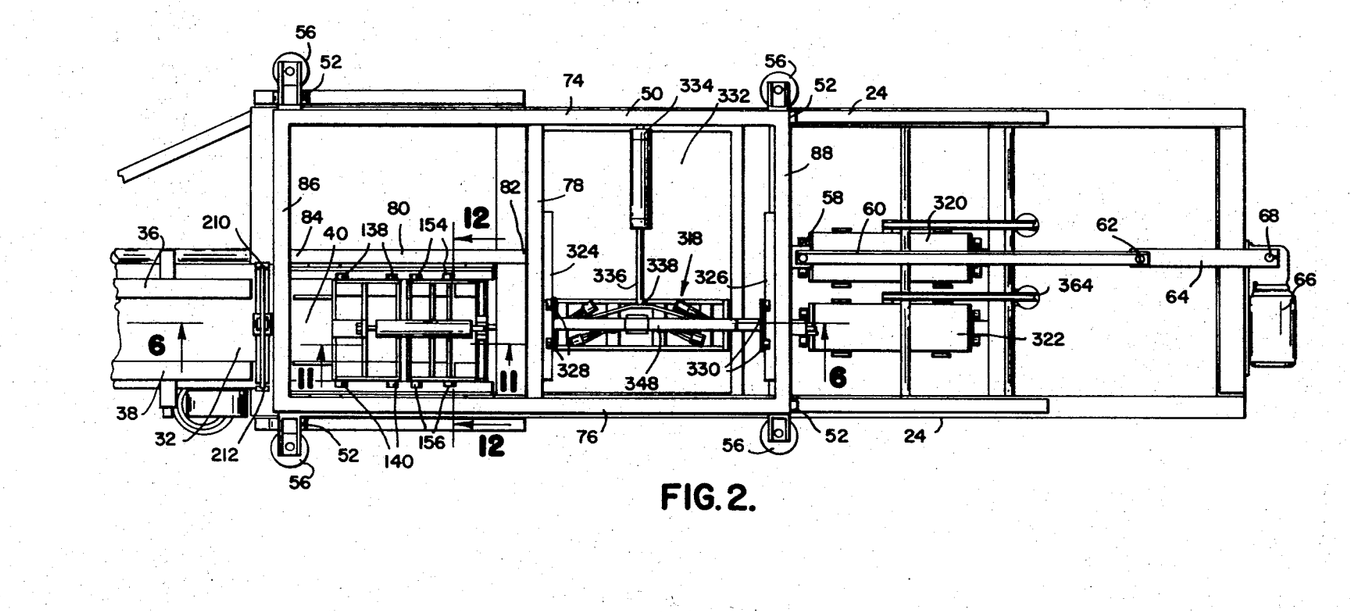
FIG. 2 is a fragmentary top or plan view of the brick stacking machine of the invention.
Figures 13, 14:
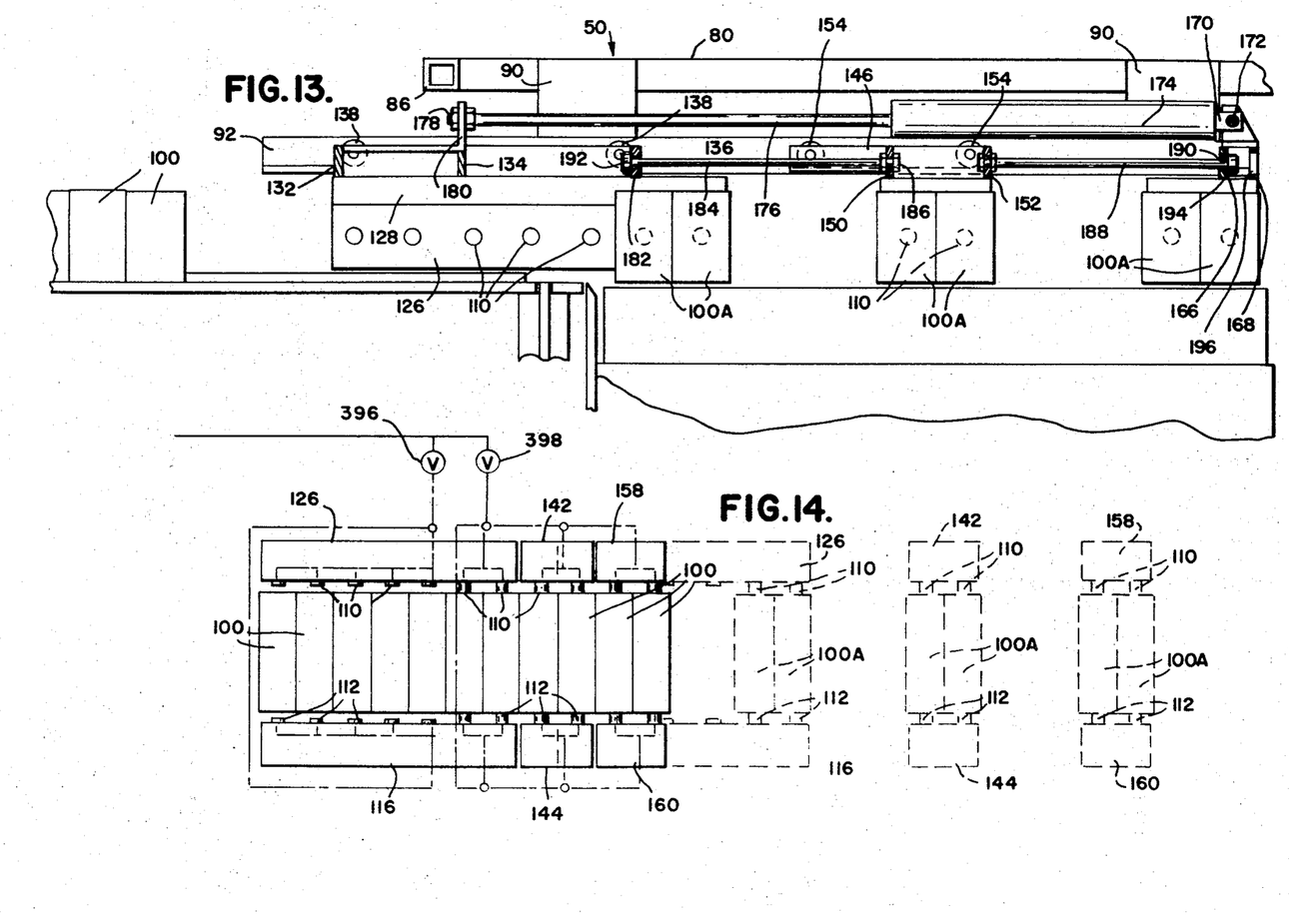
FIG. 13 is a view similar to FIG. 11, but showing the sections of the block engaging carriage of the invention separated to separate groups of bricks for the forming of voids between the groups in a void course to be arranged on the elevator of the invention.
FIG. 14 is a diagrammatic plan view showing by solid lines the carriage sections in the position, as illustrated in FIG. 11, and showing by broken lines the carriage sections separated; the carriage being shown in both positions in engagement with bricks to be formed into a void course on the elevator of the invention.
Figure 15:
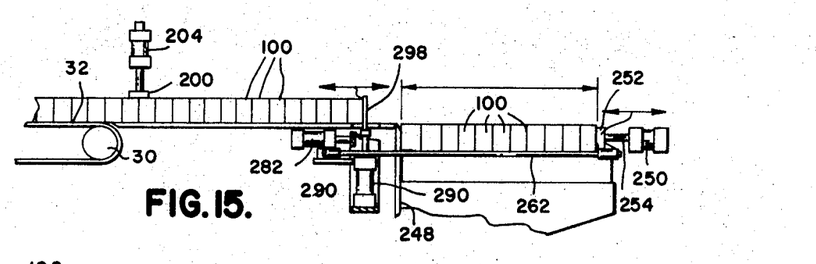
FIG. 15 is a diagrammatic view similar to FIGS. 7 and 8, but illustrating a modification of the invention including brick row measuring means in connection with an adjusting means which adjusts an end locator mechanism for locating the end of a contiguous row of bricks with respect to the brick engaging and handling carriage of the invention.

The movable carriage frame 50, as shown in FIGS. 2 and 13 of the drawings, is provided with opposite side rails 74 and 76 interconnected by a cross member 78 which supports a longitudinal member 80 at 82, either by welding or otherwise, such that the longitudinal member is secured to the cross member 78. The opposite end of the longitudinal member 80 is fixed at 84 to an end member 86 of the frame 50, this member 86 interconnecting the side members 74 and 76.

A second end member 88 interconnects opposite ends of the side members 74 and 76 of the movable frame 50.

Figures 11, 12:
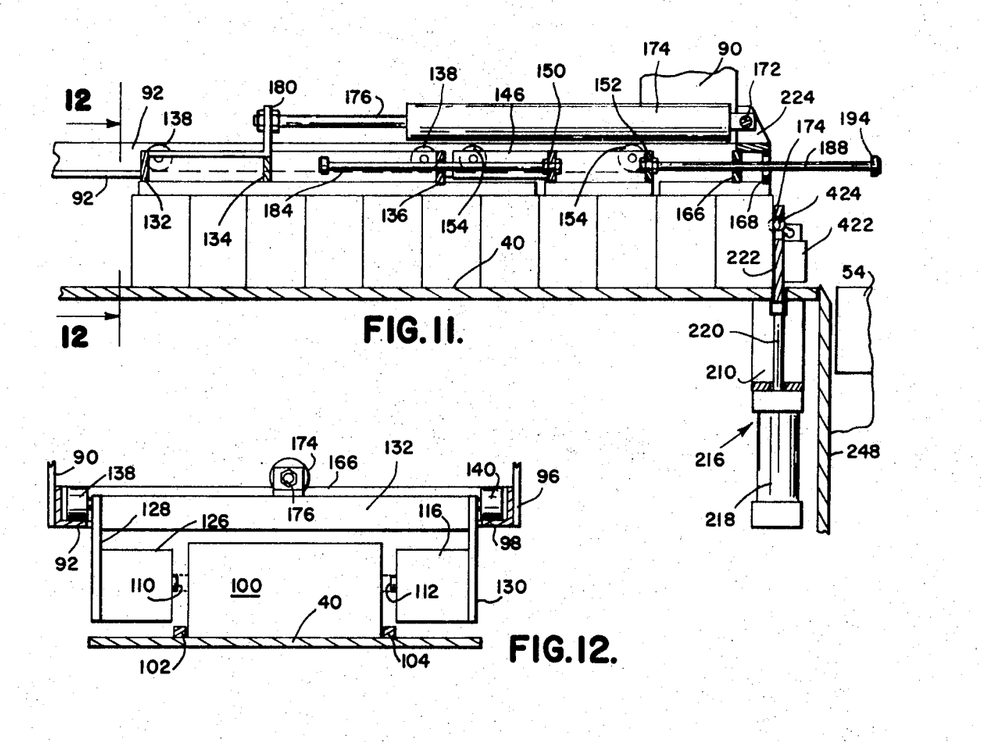
FIG. 11 is an enlarged fragmentary sectional view, taken from the line 11—11 of FIG. 2.
FIG. 12 is a fragmentary sectional view, taken from the line 12—12 of FIG. 11.

Coupled to the movable frame member 80 are suspension straps 90 which suspend a track member 92, the track 92 being particularly shown in cross-section in FIG. 12 of the drawings.

Figure 1:
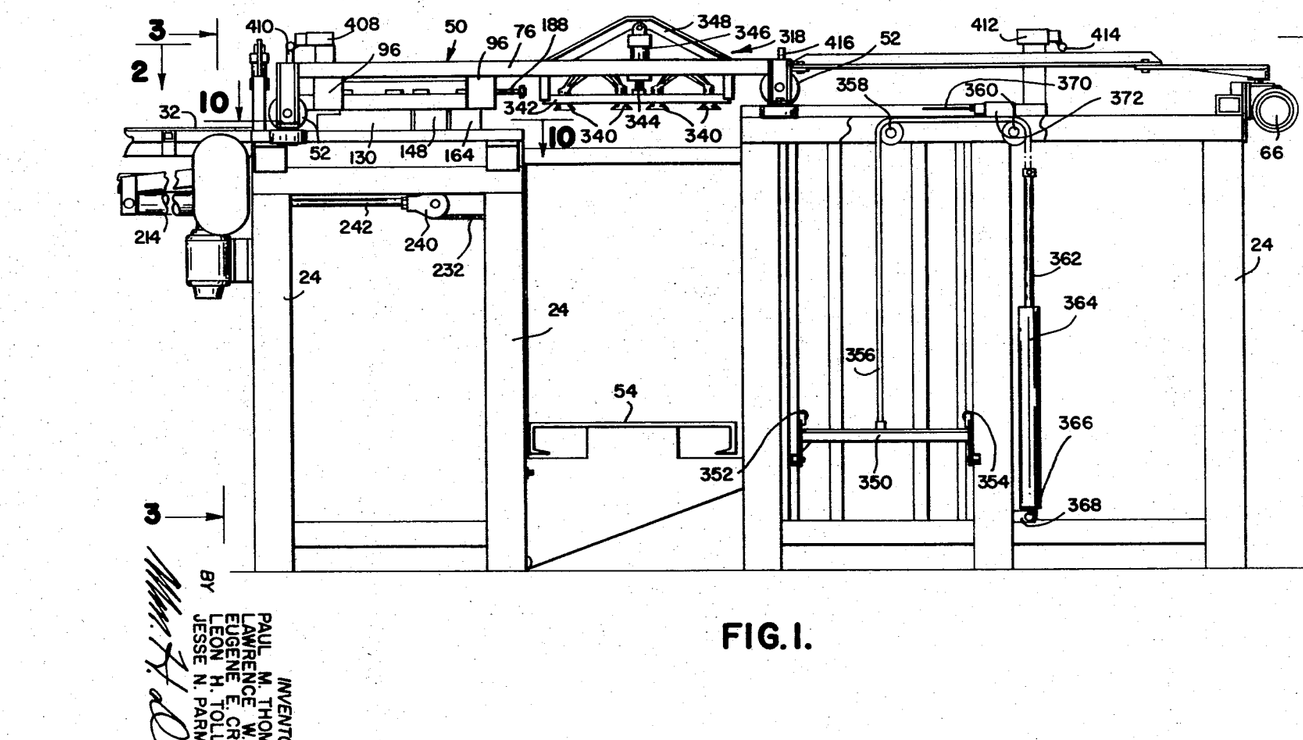
FIG. 1 is a fragmentary side elevational view of a brick stacking machine, in accordance with the present invention.

As shown in FIGS. 1 and 12, suspension straps 96 are similar to the suspension straps 90, and extend downwardly from the movable frame portion 50. These suspension straps 96 support a track 98, shown in cross-section in FIG. 12.

The tracks 92 and 98 support rollers of the separable sections of the brick engaging and carrying carriage of the invention.

Figure 10:
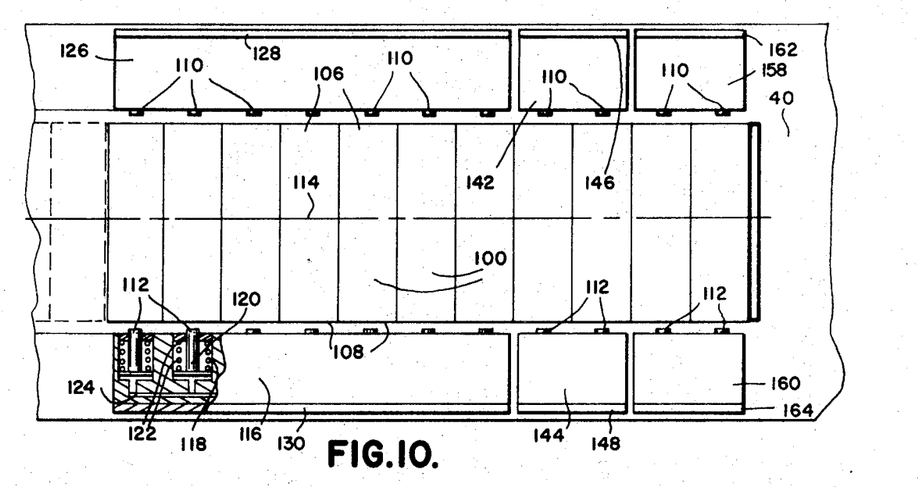
FIG. 10 is an enlarged fragmentary plan sectional view, taken from the line 10—10 of FIG. 1.

As shown in FIGS. 10 and 12 of the drawings, a row of contiguous bricks 100 may be disposed between guide rails 102 and 104 on the upper surface of the accumulator deck 40. The bricks 100 at their opposite ends 106 and 108 are disposed at opposite sides of the contiguous rows, shown in FIGS. 10, 11 and 12.

A group of brick engaging members 110 are disposed to engage the ends 106 of the bricks 100, while another group of brick engaging members 112 are disposed to engage the ends of 108 of the bricks 100. Then brick engaging members 110 form one group aligned in a row substantially parallel to a longitudinal axis 114 of the accumulator plate 40, as shown best in FIG. 10 of the drawings. The row of brick engaging members 110 forming one group disposed at one side of the longitudinal axis 114 of the accumulator deck, while the brick engaging members 112 of the other group are disposed in a row substantially parallel to the longitudinal axis 114 of the accumulator deck, and it will be seen from FIGS. 10 and 12 that the brick engaging members 110 and 112 are opposed to each other, and both groups or rows of brick engaging members are spaced apart laterally relatively to the longitudinal axis of the accumulator deck 40. The brick engaging members 110 and 112 are preferably fluid actuated plunger-type members, as shown best in FIG. 10, all of these members 110 and 112 are similar.

As shown in FIG. 10, the members 112 are mounted in a cylinder block 116, wherein double action cylinders 118 contain pistons 120 attached to the plungers 112.

Built into the cylinder block 116 is a pressure fluid manifold 124 which communicates with all of the cylinders 118 and respective pistons 120. Thus, the ends of the plungers 112 may be projected by means of hydraulic fluid pressure or air pressure into engagement with the ends 108 of the bricks 100, while the ends of the plungers 110 may be similarly projected against the ends 106 of the bricks 100 frictionally to grasp and hold them.

The carriage mechanism of the invention is divided into three separate sections, each section carrying some of the plungers 110 and some of the plungers 112. A first section of the carriage comprises the cylinder block 116 carrying the brick engaging members 112 and a similar cylinder block 126 carrying the brick engaging members 110. The blocks 126 and 116 are suspended by plates 128 and 130 shown in FIG. 10 of the drawings, also illustrated in FIG. 12. The plates 128 and 130 are interconnected above the cylinder blocks 116 and 126 by means of cross members 132, 134 and 136, shown best in FIGS. 11, 12 and 13 of the drawings.

Rotatably mounted in connection with the suspension plates 128 and 130 are pairs of rollers 138 and 140, respectively.

Another separable section of the carriage mechanism of the invention, comprises a pair of cylinder blocks 142 and 144 carried by respective suspension plates 146 and 148 similar to the plate 128 and 130, hereinbefore described. These plates 146 and 148 are interconnected by cross member 150 and 152. The suspension plate 146 is supported on rollers 154 which engage the track 92, and are supported thereon. The plate 148 being supported by rollers 156, all as shown best in FIGS. 2, 10, 11 and 13 of the drawings.

A third separable section of the carriage mechanism of the invention, comprises a pair of cylinder blocks 158 and 160, which are supported on suspension plates 162 and 164, respectively. These suspension plates are interconnected by a pair of cross members 166 and 168 which are fixed to the tracks 92 and 98 by welding, or otherwise, as desired, all as shown best in FIGS. 12 and 13 of the drawings.

Fixed to the cross members 166 and 168 is a hydraulic cylinder mount 170 carrying a pivot pin 172 pivotally coupling a hydraulic cylinder 174 to the cross members 166 and 168, the hydraulic cylinder 174 is provided with a plunger 176 having an end 178 fixed to an upstanding bracket 180 secured to the cross members 132 and 134, which are secured to the suspension plates 128 and 130. Thus, the bracket 180 tends to carry the separable sections of the block or brick engaging carriage comprising the cylinder blocks 126 and 116 in which the block engaging members 110 and 112, respectively, are mounted.

The cross member 136 which is fixed to the suspension plates 128 and 130 is provided with an opening 182 extending therethrough. A rod 184 is slidably mounted through said opening 182 and an opposite end 186 of the rod 184 is fixed to the cross member 150 secured between the suspension plates 146 and 148, which carry the cylinder blocks 142 and 144, respectively, which constitute another separable section of the block engaging end moving carriage mechanism of the invention.

Fixed to the cross member 152 which is secured between the suspension plates 146 and 148 is a rod 188. This rod 188 is slidably mounted in an opening 190 in the cross member 166 which is secured between the suspension plates 162 and 164 forming a third separable section of the carriage, this third separable section being fixed by the cross members 166 and 168 to the tracks 92 and 98, which are in turn fixed to the movable carriage frame 50.

The rod 184 is provided with stop head 192 which abuts the cross member 180, and the rod 188 is provided with a stop member 194 which abuts the cross member 166.

The cross member 168 is provided with an opening 196 of sufficient size to permit the stop head 194 to pass therethrough, as will be hereinafter described in detail.

It will be seen that the cylinder 174 may project or retract the plunger 176, which tends to separate the three separable sections of the carriage, as will be hereinafter described in detail.

The three separate sections of the carriage are separated by action of the hydraulic cylinder 174, and causes to move apart in a direction substantially parallel to the longitudinal axis, as indicated by broken lines 114, said longitudinal axis being that of the collector plate 40, as hereinbefore described.

The conveyor 32 is also provided with a longitudinal axis which substantially aligns with the longitudinal axis of the collector plate 40 so as to deliver a row of bricks 100, as shown in FIG. 10, the row being substantially aligned with the longitudinal axis 114 of the collector deck 40.

Figure 3:
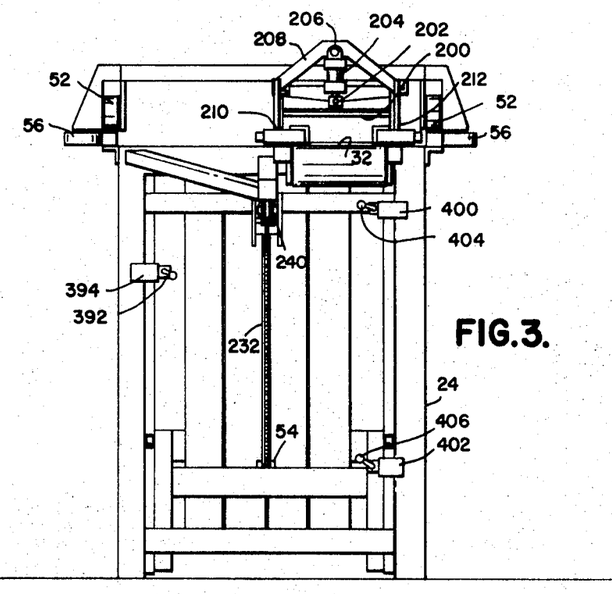
FIG. 3 is an end view of the machine of the invention, taken from the line 3—3 of FIG. 1.

Disposed at a location substantially intermediate the conveyor 32 and the collector deck 40 is a block holding plate 200. This block holding plate 200 is shown in FIG. 3 of the drawings, and is suspended in connection with a plunger 202 of the hydraulic cylinder 204 pivotally mounted by a pin 206 carried on a yoke 208 having its opposite ends supported on the main frame at 210 and 212, shown best in FIGS. 2 and 3 of the drawings.

Figure 7:
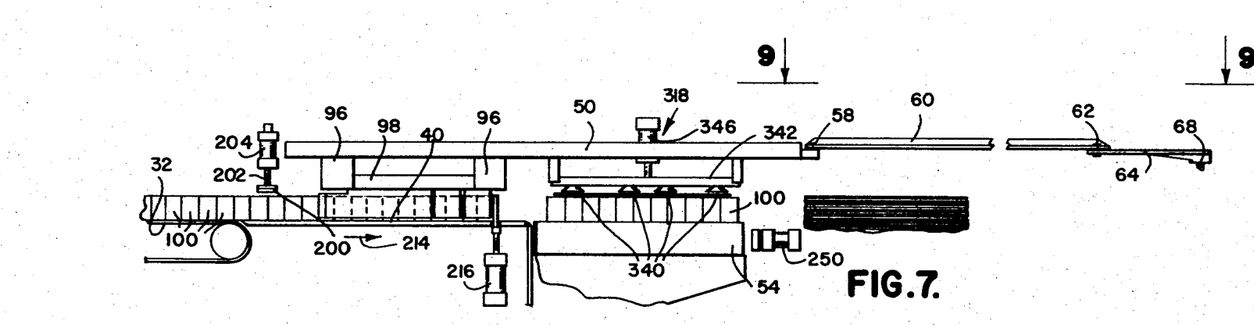
FIG. 7 is a diagrammatic illustration of the machine, viewed in a disposition substantially as shown in FIG. 1 of the drawings.

The plate 200 is adapted to engage the upper surfaces of blocks, as indicated diagrammatically in FIGS. 7 and 8 of the drawings. The plate 200 being actuated downwardly frictionally to hold the bricks 100 against movement in a direction of an arrow 214, while the brick engaging members 110 and 112 of the separable sections are engaged with the bricks, and moving toward a position over the elevator 54 during which time the separable sections, hereinbefore described, may separate as shown in FIG. 13, so as to provide a void course and to carry three pairs of the bricks 100, said pairs being designated 100A, in FIG. 13 of the drawings. Thus, each separable section carries a pair of the bricks 100 to provide three pairs of 100A which are separated from each other. It will be understood that during operation, several of the brick engaging members 110 and 112 in the cylinder blocks 126 and 116, respectively, are not hydraulically energized so that only two bricks, as shown in FIG. 13, are carried by the separable sections, including the cylinder blocks 126 and 116, as will be hereinafter described in connection with the diagrammatic disclosure in FIG. 14.

A brick row end locator 216 comprises an actuating cylinder 218, as shown in FIGS. 7, 8 and 11. The actuating cylinder 218 is mounted on a bracket 210 fixed to the accumulator deck plate 40. The cylinder 218 is provided with a plunger 220 carrying a locator plate 222 disposed near one end of the accumulator deck 40, and adapted to stop one end of a continuous row of bricks forced onto the accumulator deck 40 by the conveyor 32 in a direction of the arrow 34 in FIG. 6 and the arrow 214 in FIG. 7. locator plate 222 is provided with an upper edge portion 224 which is retractable downwardly to a level substantially flush with or slightly below the upper surface of the collector deck 40, this being accomplished by retraction of the plunger 220 in the cylinder 218 in order to permit the carriage of the invention to transfer a course of bricks from the collector deck 40 onto the elevator 54, as will be hereinafter described.

Figure 6:
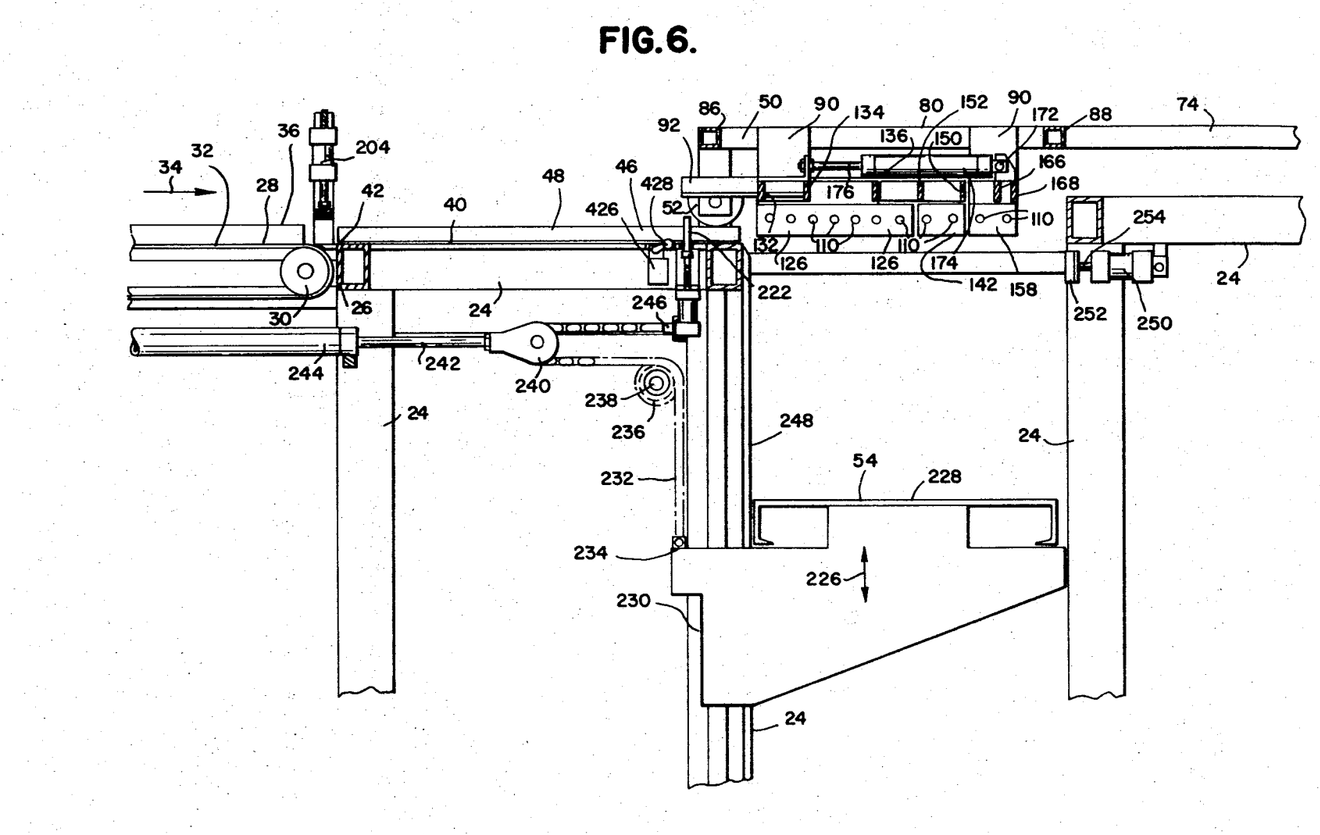
FIG. 6 is an enlarged fragmentary sectional view, taken from the line 6—6 of FIG. 2.

The elevator 54 is movable upwardly and downwardly, as indicated by a double headed arrow 226 in FIG. 6 of the drawings.

The elevator 54 is provided with a top deck 228, and is provided with conventional mechanism adapted to follow a vertical track means 230 on the main frame 24. A flexible chain 232 is fixed at 234 to the elevator 54, and this chain passes over an idler sprocket 236 fixed to the main frame, and rotatably mounted about an axle 238 carried on the main frame. The chain 232 passes over an idler sprocket in a clevis 240 secured to a plunger 242 of a hydraulic cylinder 244 stationarily mounted on the main frame 24 of the machine.

The chain at its opposite end from its fixture 234 in connection with the elevator 54 is secured at 246 to the main frame 24, such that retraction of the plunger 242 in the hydraulic cylinder 244 will cause the chain to pull the elevator 54 upwardly, and such that the extension of the plunger 242 from the cylinder 244 will permit the elevator to move downwardly.

The elevator 54 moves adjacent to a vertical plate 248, and hydraulic cylinder means 250 is provided with an actuating bar 252 secured to the plunger 254 of the hydraulic cylinder means. This bar 252, as shown in FIG. 8 of the drawings, is adapted to push a row of bricks 100 deposited on the elevator 54 against the plate 248 to vertically align superimposed courses of bricks, and also to measure the aggregate length of the contiguous row of bricks 100 in order to control positioning of the locator 216 and its stop plate 222.

Figure 16:
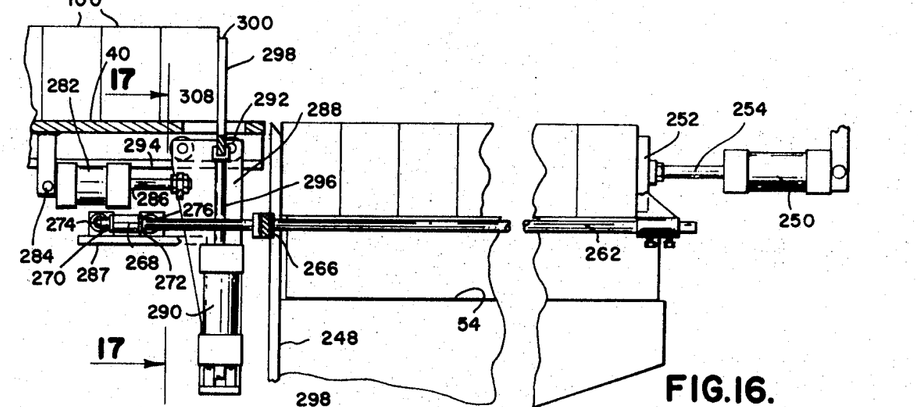
FIG. 16 is an enlarged fragmentary sectional view showing the means diagrammatically illustrated in FIG. 15.
Figure 17:
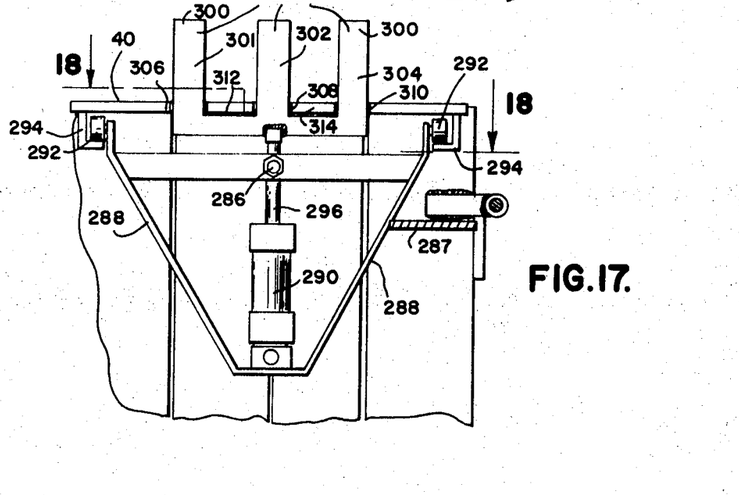
FIG. 17 is a fragmentary sectional view, taken from the line 17—17 of FIG. 16.
Figure 18:
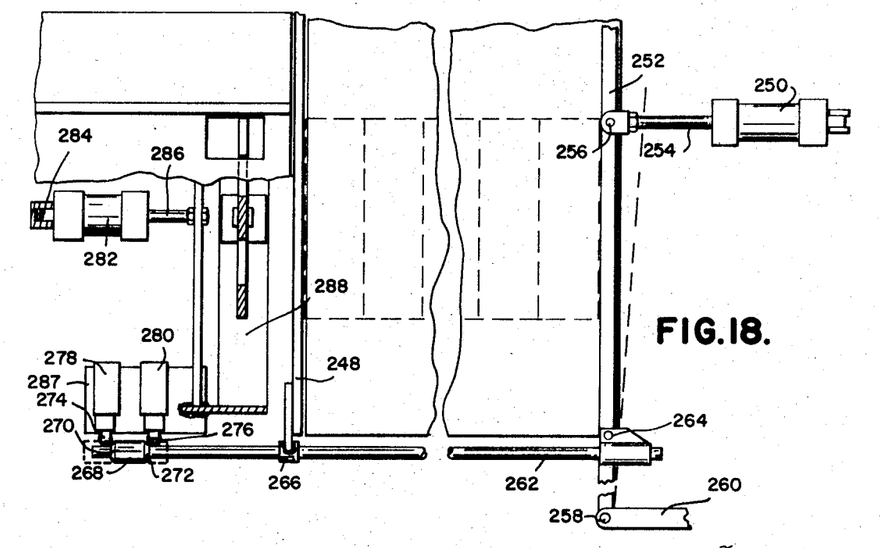
FIG. 18 is a fragmentary plan sectional view, taken from the line 18—18 of FIG. 17, the view being rotated substantially 90 degrees from that as shown in FIG. 17, and thus corresponding in direction to the mechanism, as disclosed in FIG. 16.

Reference is made to FIGS. 15, 16, 17 and 18 showing a modification of the invention, wherein the cylinder plunger 254 is shown coupled to the bar 252. Referring to FIG. 18, it will be seen that the plunger 254 is pivotally connected by a pin 256 to the bar 252, and that an end of the bar 252 is pivotally mounted by means of a pin 258 to a stationary fulcrum member 260 secured to the main frame 24. A link 262 is pivotally connected to the bar 252 by means of a pin 264, and this link is slidably mounted in a bearing 266 mounted on the plate 248.

An enlarged spool portion 268 is carried by the link 262, and opposite end portions 270 and 272 of the spool portion 268 are engageable with respective actuating switches 274 and 276 of solenoid valves 278 and 280, respectively, which control the dispensation of pressure fluid to a hydraulic cylinder 282 which is pivotally mounted on a pin 284 in connection with the lower portion of the accumulator deck 40, as shown best in FIG. 16 of the drawings. The hydraulic cylinder 282 is provided with a plunger 286 which is extendable and retractable in accordance with operation of the solenoid valves 278 and 280. This plunger 286 is connected to a trolley bracket 288 carrying the hydraulic cylinder 290 which is similar to the hereinbefore described cylinder 218, this cylinder 290 being provided with a plunger 296 connected to a brick row end locator plate 298 similar to the plate 222, hereinbefore described. This plate 298 is provided with a normally upper edge 300 which is retractable downwardly into flush disposition with the upper surface of the collector deck 40, or to a position slightly therebelow.

The trolley bracket 288 is provided with mounting rollers 292 which follow tracks 294 in a direction substantially parallel to the longitudinal axis of the collector deck 40, and in a direction longitudinally relative to a contiguous row of bricks 100 on the accumulator deck 40.

The solenoid valves 278 and 280 are carried by a bracket 287 fixed to the trolley bracket 288.

The plate 298 is formed into three separate finger portions 301, 302 and 304, as shown best in FIG. 17 of the drawings, and these fingers project upwardly through respective openings 306, 308 and 310 in the collector deck plate 40. Thus, the openings 306, 308 and 310 are elongated in a direction longitudinally of the longitudinal axis of the collector deck 40 so that the fingers 301, 302 and 304 of plate 298 may be moved longitudinally within the slotted openings 306, 308 and 310. The longitudinal length of these slots may be equal to the width of one of the bricks 100, however, intermediate sections 312 and 314 of the accumulator deck 40 between the fingers 301, 302 and 304 provides a sliding surface extension of the collector deck 40 on which the bricks 100 may slide as the locator 298 is moved in a direction parallel to the longitudinal axis of the collector deck 40.

It will be seen from FIGS. 16 and 18 of the drawings, that when the hydraulic cylinder 250 is energized, the plunger 254 thereof moves the bar 252 about the pivot pin 258 until a row of bricks 100 is clamped securely between the bar 252, and the plates 248. At this time, the link 262 is actuated to move its spool into or out of engagement with the actuator switches 274 or 276 of the solenoid valves 278 or 280. The bar 252 and plate 248 constitute a measuring means when considering the operation of the link 262 and the spool 268 with respect to the actuating member 274 and member 276 of the solenoid valves 278 and 280, respectively.

It will be understood that the aggregate length of the row of blocks 100 on the elevator 54, as shown in FIGS. 16 and 18, may vary in accordance with a given production run. If the blocks are long, the aggregate length will be greater, and in this instance, a measurement of the row of bricks 100 being excessively long will cause the spool 268 to remain on the actuator switch 276 of the solenoid valve 280. Accordingly, the cylinder 282 will be energized to move the trolley plate 288 and hydraulic cylinder 290, together with the locator plate 298 in a direction toward the hydraulic cylinder 250, and the movement of the locator plate 298 with its fingers 301, 302 and 304 will be equal to one-half of the movement of the bar 252 since there is a leverage ratio of two to one between the pivot pins 256 and 264, and the pivot pins 264 and 258, respectively. Thus, the brick row end locator 298 will be moved in a direction to locate a row of bricks with respect to the separable sections of the carriage, such that the pairs of bricks 100A, as shown in FIG. 13, will be aligned with respective brick engaging members 110 and 112 of the respective separable sections. Thus, differences in dimensions of the bricks resulting in overall difference in aggregate length of a row of bricks deposited on the conveyor, will cause the measuring and adjusting mechanism, shown in FIGS. 16 and 18, to locate the brick row end locator 298 in accordance with the variations in the bricks from a given standard dimension.

It will be seen that should the aggregate length of the row of bricks 100 on the elevator 54, as shown in FIG. 16, be quite short the spool 268 will be moved into engagement with the switch 274 of the solenoid valve 278 which will energize the hydraulic cylinder 282 to retract its plunger 286, and to retract the trolley bar 288 carrying the hydraulic cylinder 290 and the brick end locator plate 298 in a direction toward the hydraulic cylinder 282, and to thereby compensate for a relatively short contiguous row of bricks 100, and to thereby locate such short bricks precisely, such that the groups 100A, shown in FIG. 13, will be properly aligned for separation from each other in connection with the separable sections of the brick engaging and moving carriage of the invention, as hereinbefore described.

As shown in FIGS. 1 and 2 of the drawings, and diagrammatically in FIGS. 7 and 8 of the drawings, a pallet handling mechanism 318 is mounted on the movable carriage frame 50, and to be carried thereby back and forth with the separable carriage sections, this pallet handling mechanism 318 is adapted to be moved over an area of paper and pallet magazines 320 and 322, when the block or brick engaging mechanism of the invention is disposed over the elevator 54.

A pair of tracks 324 and 326 are mounted on the member 78 and 88 of the carriage frame 50, as shown in FIG. 2 of the drawings. These tracks 324 and 326 support rollers 328 and 330 of the pallet carrying mechanism 318 which is movable back and forth in directions of a double ended arrow 332 in FIG. 2 of the drawings. The mechanism 318 is movable by means of the hydraulic cylinder 334 having a plunger 336 connected to a frame 338 of the pallet handling mechanism 318. The hydraulic cylinder 334 is pivotally mounted on the side frame member 74 of the movable carriage frame 50 so that when the plunger 336 is retracted, the pallet handling mechanism 318 is disposed over the magazine 320, and when the plunger 336 is extended, the mechanism 338 may be disposed over the magazine 322.

The handling mechanism 318 is provided with downwardly directed vacuummatic pickup nozzles 340, as shown best in FIG. 1 of the drawings; the operation of which is shown diagrammatically in FIGS. 7 and 8 of the drawings.

These vacuummatic pickup nozzles 340 are carried on a bar 342 which is vertically movably carried by a plunger 344 of a pressure fluid cylinder 346 pivotally mounted on an upstanding frame portion 348 of the handling mechanism 338.

Each magazine 320 and 322 is similar, the magazine 322 being provided with an elevatable platform 350 having track rollers 352 and 354 traversing vertical tracks on the main frame 24.

A flexible chain 356 is connected to the platform 350, this chain passing over a pair of idler rollers 358 and 360. The chain also being coupled to a plunger 362 of a hydraulic cylinder 364, which is pivotally mounted at 366 to a bracket 368 on the main frame 24. Thus, retraction of the plunger 362 progressively moves the platform 350 upwardly to a feed stack of paper or pallets up toward the vacuummatic pickup nozzles 340, which operate with respect thereto, as will be hereinafter described in detail.

It will be appreciated that both magazines 320 and 322 operate in a similar manner. The control for energizing the cylinder 364 being accomplished through a feeler lever 370 mounted on a stationary switch 372 which may normally be coupled to an orifice control valve adapted to control the flow of hydraulic fluid to the cylinder 364, and to slowly extend the plunger 362 in small increments to maintain correct elevation of paper, as the piece of paper or pallets may be removed from the magazines 320 and 322, as will be hereinafter described.

Figure 4:
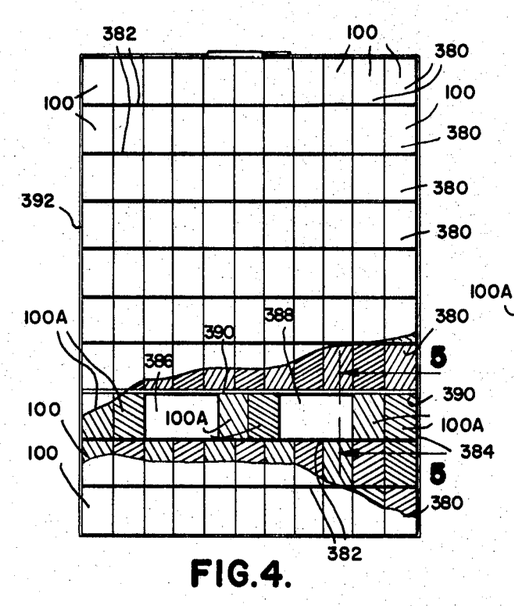
FIG. 4 is a side elevational view of a stack of bricks, as formed by the machine of the invention, and showing portions of the stack broken away and in section to clarify the illustration with respect to openings formed in a void course in the stack of bricks.
Figure 5:
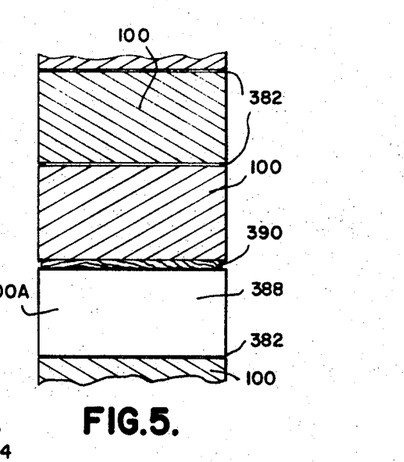
FIG. 5 is an enlarged fragmentary sectional view of the stack of bricks, taken from the line 5—5 of FIG. 4.

As shown in FIG. 4 of the drawings, a stack of bricks comprises superimposed courses 380 of bricks 100. Between these courses are sheets of paper 382, as illustrated in section. There are two solid courses 380 in which contiguous rows of bricks are separate by sheets of paper 382, and a void course 384 forms the third course from the bottom, and it comprises groups 100A, as hereinbefore described, of the bricks 100. These groups 100A are spaced apart to provide void openings 386 and 388 adapted to receive forks of a handling truck, or the like.

Directly above the course 382 and overlying the openings 386 and 388 is a pallet 390 which is preferably made of a thin plate of wood or other suitable material. This pallet 390 is adapted to be engaged by the handling forks of a lift truck, or the like, to prevent damage to the bricks in the course 380 directly above the openings 386 and 388, this pallet 390 also supports the bricks above the void openings, and hold them in place. The overall stack of bricks is surrounded by a conventional steel band 392 which is secured around the stack of bricks by a machine, which is no part of the present invention.

It will be seen that the operation of the carriage of the machine is adapted to form the solid courses 380 by holding the three separable sections of the carriage together, when the plunger 176 of the cylinder 174 is retracted, and when the plunger 176 is extended, the separable sections of the carriage are separated apart, as shown in FIG. 13 and hereinbefore described, to provide the void course 384, shown in FIG. 4 of the drawings.

The elevator 54 is started in an uppermost position to receive a first course of bricks 380, which is a solid course, then another solid course 380 is placed on top of the first solid course with a layer of paper 382 between the first and second courses. Another layer of paper is placed over the second course, and the void course 384 is then placed on top of the paper over the first two courses 380.

At this time, the elevator moves downward to contact a roller arm 392 of a limit switch 394 which activates circuitry to operate the cylinder 174 and to extend the plunger 176 so as to separate the groups of bricks 100A to form the voids 386 and 388.

During the operation of the plungers 110 and 112, the plungers 110 and 112 at the left of the groups 100A, shown in FIG. 13, are not energized at this time in order that only six bricks will be picked up between the plungers 110 and 112 of the separable sections of the carriage.

To accomplish this operation, solenoid control valves 397 and 398 are provided to control fluid to the manifold in the cylinder blocks 126, 142, 158, 116, 144 and 160. The valve 396 conducts pressure fluid to the five brick engaging plungers 110 and 112 at the left ends of the cylinder blocks 126 and 116, as shown in FIGS. 10 and 13, so that when the valve 396 is in one position, these particular brick engaging plungers are not energized, and only two of each of the plungers 110 and 112 in the cylinder blocks 126 and 116 are energized through the valve 398. Also, the valve 398 energizes the brick engaging plungers 110 and 112 in the cylinder blocks 142, 158, 144 and 160. Thus, during the formation of the void course 384, only six bricks are engaged and separated into the groups 100A spaced apart to form the void openings 386 and 388, all as illustrated best in FIGS. 4, 13 and 14. When it is desired to form a solid course of bricks 380, as shown in FIG. 4 and in FIGS. 7 and 8, all of the brick engaging plungers 110 and 112 are energized to engage bricks, and the cylinder 174 remains de-energized so that all of the separable sections remain in continuous close relationship to each other for forming a solid course of bricks 380, in which all of the bricks are in a contiguous row with each other.

With reference to FIG. 3, limit switches 400 and 402 are provided with engaging rollers 404 and 406, respectively, to be engaged by the elevator 54, when in its uppermost and lowermost positions, respectively, to thus limit operation of the cylinder 244 and its plunger 242, as hereinbefore described.

A limit switch 408 is mounted on the main frame 24, and is provided with a roller 410 to be engaged by the movable carriage frame 50 to limit movement thereof in a direction toward the conveyor 32, and to thus control operation of the motor 66. Another limit switch 412 is provided with a roller arm 414, and is disposed to be engaged by a stop 416 on the movable carriage frame 50 to limit the movement of the carriage frame 50 towards the motor 66, and to precisely position the pallet handling mechanism 318 over the magazines 320 and 322, as hereinbefore described, and to locate the separable sections of the carriage over the elevator 54.

Figure 20:
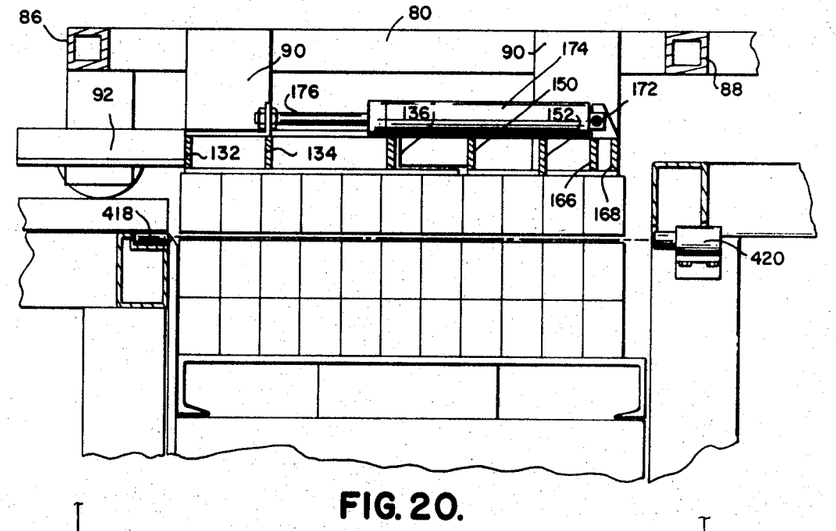
FIG. 20 is a vertical sectional view of the machine, taken through the elevator thereof, and showing the carriage of the machine disposed directly over the elevator and carrying a contiguous row of bricks and forming a solid course without a void therein.

As shown in FIG. 20, a pair of photocell units 418 and 420 are disposed to be communicative across the top of the elevator 54, and in a position such that a light beam between the two photocell units 418 and 420 will be interrupted when the elevator holds a course of blocks in substantially an uppermost position, and such that a lower surface of the course of blocks is substantially on a plane coinciding with the collector deck 40.

A limit switch 422, as shown in FIG. 11 of the drawings, is provided with a roller arm 424 which is engaged by the blocks 100, when they come in contact with the plate 222 or the plate 298, and its fingers 301, 302 or 304, as shown in FIG. 17 of the drawings. This limit switch 422 completes a circuit to the solenoid valves 396 and 398 for actuating the block engaging plungers 110 and 112, and also activates retraction of the cylinder plunger 220 so as to energize a motor 66, and move the carriage to a position over the elevator 54, whereupon the limit switch 412 is activated to stop the motor 66 with the carriage over the elevator, and the pallet handling mechanism 318 over the magazine 320 or the magazine 322 depending upon the position of the plunger 336 of the cylinder 334, as hereinbefore described.

Figure 21:
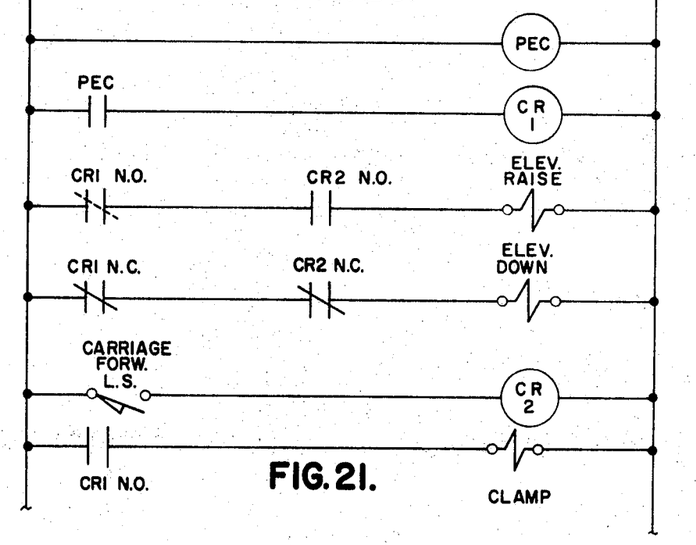
FIG. 21 is a diagrammatic illustration of some of the electrical equipment of the invention pertaining to general console of the carriage and elevator mechanism thereof.

As the carriage moves over the elevator, and actuates the limit switch 412, this switch energizes the elevator in an upward direction by means of the cylinder 214 through a control relay CR-2 disclosed in FIG. 21 of the drawings. The elevator continues to rise until the photoelectric beam is interrupted between the photocell elements 418 and 420. This causes de-energization of control relay CR-1 and causes retraction of the block engaging plungers 110 and 112 to place the course of bricks on the elevator. The elevator then lowers, when control relay CR-2 is de-energized, and the elevator continues to lower until the light beam between the photocell elements 418 and 420 is re-established. Control relay CR-2 becomes de-energized, when the carriage moves away from the limit switch 412 to prevent the elevator from raising until the carriage is again in a position to contact the limit switch 412.

Figure 19:
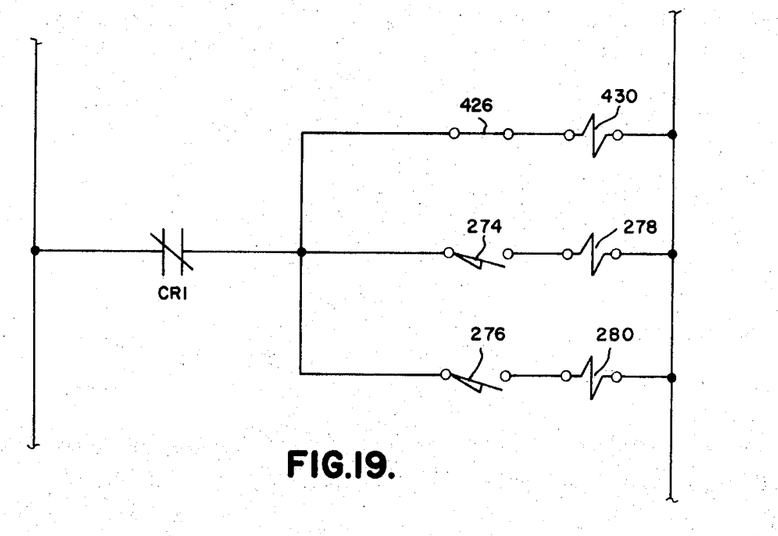
FIG. 19 is a diagrammatic view of some of the electrical equipment of the machine of the invention used in connection with the structure disclosed in FIGS. 16, 17 and 18 of the drawings.

With reference to FIG. 19 of the drawings, it will be seen that control relay CR-1 disclosed in FIG. 21, is in circuit with the solenoid valves 278 and 280 through the respective actuating switches 274 and 276.

Also in circuit with these switches 274 and 276, and control relay CR-1 is a limit switch 426, shown mechanically in FIG. 6 of the drawings. This limit switch 426 is provided with a contact roller 428 adapted, when engaged by blocks to control operation of the cylinder 204, hereinbefore described. It will be understood that the row of bricks being measured, as shown in FIG. 16 of the drawings, and as hereinbefore described, requires that the bricks be located on the elevator, and that the measurement operation occurs, as hereinbefore described, to predetermine adjustment of the plate 298 for locating a subsequent contiguous row of bricks to be picked up by the brick engaging members 110 and 112.

The switch 426 is in circuit with a solenoid valve 430 which controls fluid to the cylinder 204. The plate 222 is adjusted while the carriage moves into position over the collector plate, and before the bricks activate L.S. 422.

It will be obvious to those skilled in the art that various modifications of the present invention may be resorted to.

We claim:

1. In a brick stacking machine for cured bricks, the combination of: a main frame; a collector deck supported by said main frame and having a longitudinal axis; said collector deck disposed to support a row of contiguous bricks substantially parallel to said longitudinal axis; a carriage horizontally movably mounted on said frame above said collector deck; said carriage movable away from a position over said collector deck, said carriage having a plurality of separable sections movable toward and away from each other in a substantially horizontal direction; actuator means on said carriage for moving said sections toward and away from each other; first and second groups of brick engaging members mounted on said sections of said carriage, said brick engaging members of each section adapted to engage and hold a plurality of bricks in contiguous relation to each other, said first group of brick engaging members arranged in a first row, said second group of brick engaging members arranged in a second row substantially parallel with and spaced laterally relative to said first group, said first and second rows of brick engaging members opposed to each other and spaced apart to receive said row of contiguous bricks therebetween, said brick engaging members disposed above said deck and adapted to engage opposite sides of said row of contiguous bricks on said deck; first means on said carriage for actuating said brick engaging members of one of said first and second rows toward and away from the other, some of said engaging members of each of said first and second rows carried by each of said sections, said actuator means disposed to move said sections apart to provide spacing between only some of said contiguous bricks to provide a pair of handling fork receiving spaces in said row of contiguous bricks all of said load engaging means being operated to engage all of the bricks in the contiguous row during the normal operation wherein the row is shifted without any spaces being formed therein, while when a row with spaces therein is to be formed, the spaced row is formed from only a contiguous portion of the normally engaged row, said contiguous portion being less than the length of said normally engaged row, and the spacing being caused by the shifting of said sections relative to each other by said actuator means.

2. The invention, as defined in claim 1, wherein: one of said sections is longer, in a direction substantially parallel to said rows, than the remaining ones of said sections.

3. The invention, as defined in claim 2, wherein: each one of said sections carries a plurality of said brick engaging members of each of said first and second rows of brick engaging members.

4. In a brick stacking machine, the combination of: a main frame; an elongated conveyor having a longitudinal axis and disposed to feed bricks onto said main frame; a collector deck supported by said main frame and located to receive a row of contiguous bricks from said conveyor, said collector deck having a longitudinal axis disposed parallel to said longitudinal axis of said conveyor, said collector deck adapted to receive said row of contiguous bricks in a disposition substantially parallel to said longitudinal axis, a carriage horizontally movably mounted on said frame above said collector deck; said carriage movable in a direction substantially parallel to said longitudinal axis, said carriage having a plurality of separable sections movable toward and away from each other in a direction substantially parallel to said longitudinal axis; actuator means on said carriage for moving said sections toward and away from each other in a direction parallel with said axis; first and second groups of bricks engaging members mounted on said sections of said carriage, said brick engaging members of each of said sections adapted to engage and hold a plurality of said bricks in contiguous relation to each other, said first group of brick engaging members arranged in a first row substantially parallel with and spaced laterally relative to said longitudinal axis of said collector deck; said second group of brick engaging members arranged in a second row substantially parallel with and spaced laterally relative to said longitudinal axis of said collector deck, said first and second rows of brick engaging members opposed to each other and spaced apart relative to opposite sides of said longitudinal axis of said collector deck, said brick engaging members disposed above said deck and adapted to engage opposite sides of a row of contiguous bricks on said deck; first means on said carriage for actuating said brick engaging members of one of said first and second rows toward and away from the other, a plurality of said brick engaging members of each of said first and second rows carried by each of said sections, said actuator means disposed to move said sections apart to provide spacing between only some of said contiguous bricks to provide a pair of handling fork receiving spaces in said row of contiguous bricks, all of said load engaging means being operated to engage all of the bricks in the contiguous row during the normal operation wherein the row is shifted without any spaces being formed therein, while when a row with spaces therein is to be formed, the spaced row is formed from only a contiguous portion of the normally engaged row, said contiguous portion being less than the length of said normally engaged row, and the spacing being caused by the shifting of said sections relative to each other by said actuator means.

5. The invention, as defined in claim 1, wherein: a stack receiving elevator is mounted to move up and down adjacent said collector deck; second means for moving said carriage from a position over said collector deck to a position over said elevator for depositing rows of bricks thereon; power operated means for moving said elevator up and down.

6. The invention, as defined in claim 5, wherein: measuring means is disposed to measure the length of a row of bricks on said elevator; a brick row end locator disposed to engage and locate one end of a row bricks on said collector deck; and adjusting means operable by said measuring means and coupled to said locator for moving said locator back and forth in a direction substantially parallel to said rows of brick engaging members, whereby said measuring means measures the aggregate length of rows of bricks deposited on said elevator, and said adjusting means adjusts the position of each successive row of bricks on said collector deck, such that an end to end disposition of each successive row of bricks may be located accurately with respect to said separable sections of said carriage.

7. The invention, as defined in claim 6, wherein: said adjusting means is adapted to move said locator a distance equal to half of the end to end difference in length between each successive row of bricks placed on said elevator.

8. The invention, as defined in claim 1, wherein: a stack receiving elevator is mounted to move up and down adjacent said collector deck; second means for moving said carriage from a position over said collector deck to a position over said elevator for depositing rows of bricks thereon; power operated means for moving said elevator up and down; power operated means movably mounted to move up and down above said conveyor and said collector deck for engaging and holding bricks back relative to said conveyor, while said carriage is moving between said deck and said elevator.

9. The invention, as defined in claim 5, wherein: said second means comprises a link having first and second ends; said first end of said link pivotally connected to said carriage; a crank arm disposed to rotate in a circular path, said second end of said link pivotally connected to said crank arm to move in said circular path; and motor means for rotating said crank arm.

10. The invention, as defined in claim 9, wherein: said crank arm is of a length such that it, when rotated approximately 180 degrees, causes said link to move said carriage from a position over said collector deck to a position over said elevator.

11. The invention, as defined in claim 1, wherein: a conveyor is disposed to force a row of bricks longitudinally along onto said collector deck; a brick row end locator adapted to be engaged by a row of bricks as they are forced onto said deck by said conveyor; said locator retractable downwardly below said deck, whereby said row of bricks may be engaged by said brick engaging members and moved toward said elevator.

12. The invention, as defined in claim 11, wherein: track means is located on said frame, said carriage is movably mounted on said track means; an upper surface of said deck and said track means diverging slightly in a vertical direction toward said elevator to provide clearance for said row of bricks, when moved relative to said upper surface of said deck in a direction toward said elevator.

13. The invention, as defined in claim 5, wherein: a pallet magazine is disposed at a side of said elevator opposite to said collector deck; and vacuummatic pickup means supported on said carriage is disposed to be moved from a position over said pallet magazine to a position over said elevator, when said rows of brick engaging members are disposed above said deck.

14. The invention, as defined in claim 1, wherein: said brick engaging members comprise pressure fluid actuated plungers having their plunger axes disposed substantially horizontally.

15. The invention, as defined in claim 1, wherein: said carriage is provided with a movable frame; tracks on said main frame on which said movable frame is movably mounted, said movable frame having section tracks on which said separable sections are movably mounted; and stop means on said movable frame disposed to limit the separating movement of said sections, and to thereby locate them accurately spaced relative to each other, when moved away from each other.

16. The invention, as defined in claim 15, wherein: one of said sections is fixed to said movable frame, said actuating means connected to said movable frame, and coupled to the remaining one of said sections which are movable relative to said one of said sections.

17. The invention, as defined in claim 2, wherein: said brick engaging members carried by said longer section of said carriage, are operable independently relative to the brick engaging members carried by said remaining sections, said first means disposed and adapted independently to operate said brick engaging members carried by said longer section of said carriage.

18. The invention, as defined in claim 13, wherein: means is coupled to said movable frame of said carriage and disposed to move said vacuummatic pickup means up and down relative to said pallet magazine.

19. The invention, as defined in claim 1, wherein: said first means on said carriage is disposed to extend and retract said brick engaging members relative to both opposite sides of said row of bricks to allow said brick engaging members to clear said row of bricks, when moving into position over said collector deck.

20. The invention, as defined in claim 5, wherein: said power operated means is adapted to move said elevator up to bricks held in said carriage.

References Cited

UNITED STATES PATENTS

| | | | |
|---|---|---|---|
| 2,397,720 | 4/1946 | Beane | 214—6 |
| 2,658,614 | 11/1953 | Van Patten | 214—10.5 X |
| 2,710,696 | 6/1955 | Fontaine et al. | 214—6 |
| 3,128,890 | 4/1964 | Paisley | 214—6 |
| 3,169,646 | 2/1965 | Mason | 214—6 |
| 3,260,379 | 7/1966 | Bason | 214—6 |
| 3,262,594 | 7/1966 | Teago. | |
| 3,270,897 | 9/1966 | Lingl | 214—6 |

FOREIGN PATENTS

| | | |
|---|---|---|
| 914,957 | 1/1963 | Great Britain. |
| 193,167 | 12/1964 | Sweden. |

GERALD M. FORLENZA, Primary Examiner

R. J. SPAR, Assistant Examiner

U.S. Cl. X.R.

294—62